WILLETT F. BALDWIN
VASEL R. SLOVER
INVENTORS

BY

ATTORNEY

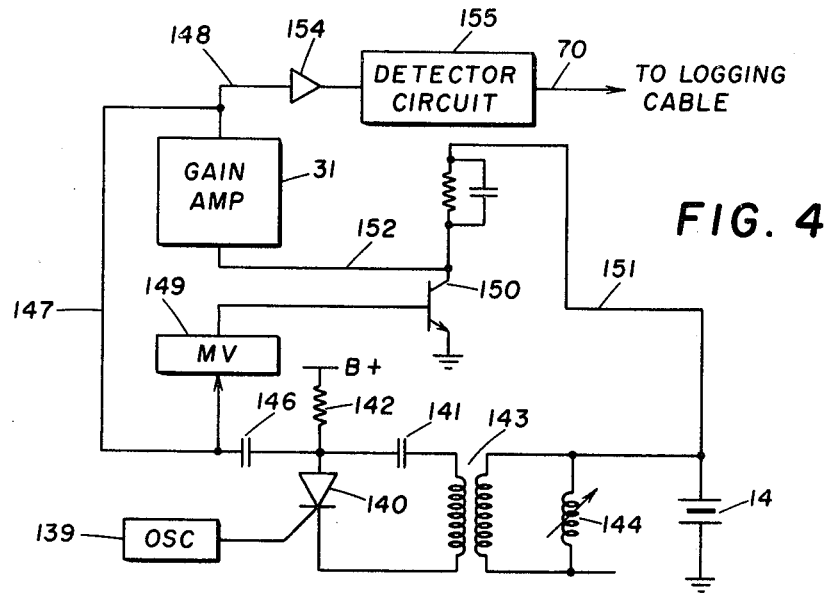
FIG. 4
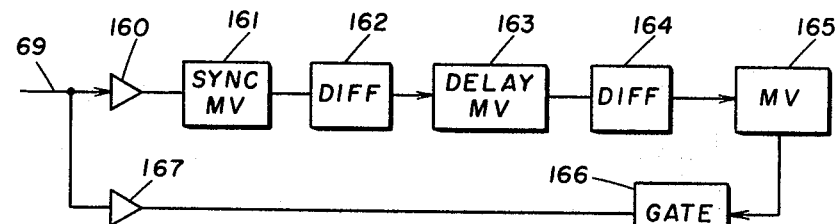
FIG. 5
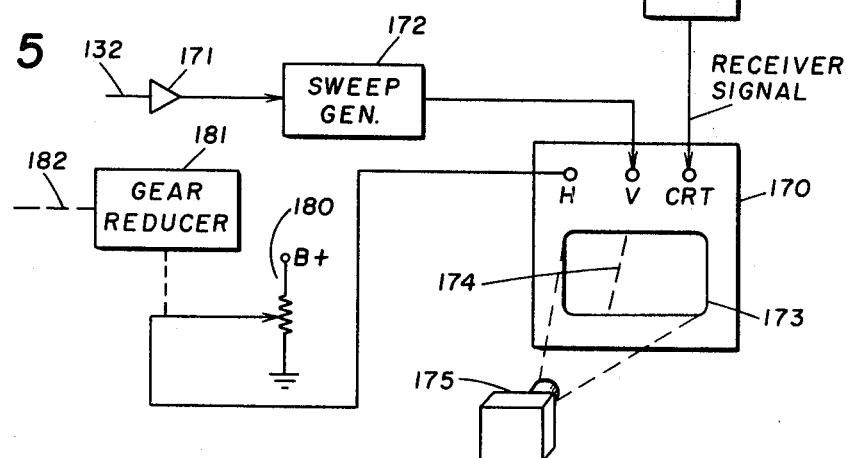
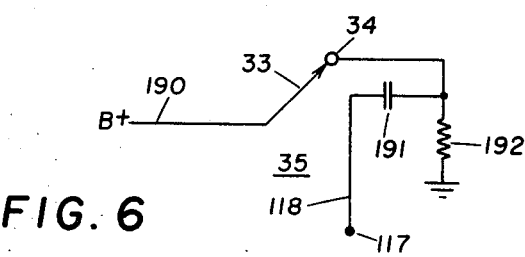
FIG. 6
WILLETT F. BALDWIN
VASEL R. SLOVER
INVENTORS
BY
ATTORNEY

United States Patent Office 3,518,679
Patented June 30, 1970

3,518,679
WELL LOGGING SYSTEM EMPLOYING THREE-CONDUCTOR LOGGING CABLE
Willett F. Baldwin, Dallas, and Vasel R. Slover, Irving, Tex., assignors to Mobil Oil Corporation, a corporation of New York
Filed Apr. 22, 1969, Ser. No. 818,259
Int. Cl. G01v 1/22, 1/40
U.S. Cl. 340—18                        3 Claims

ABSTRACT OF THE DISCLOSURE

The specification discloses a shielded, three-conductor logging cable for transmitting signals and power between the surface and an acoustic logging tool. D-C power is applied downhole by way of two conductors and the shield, while A-C power is applied downhole by way of the third conductor and the shield. The received signals from the acoustic transducer and sync pulses are transmitted uphole by way of the first two conductors, while a cyclic control signal, which may be indicative of direction, is transmitted uphole by way of the third conductor.

BACKGROUND OF THE INVENTION

This invention relates to a three-conductor signal transmission system for transmitting signals and power between an acoustic logging tool and the surface of the earth.

In U.S. Pat No. 3,369,626 which issued on Feb. 20, 1968 to Joseph Zemanek, Jr., there is disclosed an acoustic borehole logging technique and system wherein the walls of the borehole are scanned periodically with acoustic energy for obtaining information of interest. In one embodiment, a single transducer which acts both as a transmitter and receiver is rotated in the borehole and periodically actuated by a pulse generator to produce acoustic pulses which are applied to the borehole wall. Reflected energy is detected by the transducer between acoustic pulses and converted into signals which are employed in an uphole recording system to intensity modulate the electron beam of an oscilloscope which is swept across the screen of the scope once for each rotation of the transducer. Sync pulses generated by the pulse generator also are employed to ensure that the receiver signals, rather than undesired noise, intensity modulates the electron beam. A control signal, produced downhole during each rotational cycle of the transducer, is employed to periodically initiate the sweep of the electron beam whereby successive traces are produced on the face of the scope. These traces are photographed for the production of a two-dimensional, flat record of the inside surface of the borehole wall.

In United States patent application Ser. No. 757,971 which was filed Sept. 6, 1968 by Willett F. Baldwin and assigned to the same assignee as the present application, there is disclosed a slim hole well logging system which employs an arrangement similar to that described above. This system is used for production logging and employs a borehole tool having a diameter of 1¾ inches which is small enough to pass through production tubing. In such a system it is desirable to use a logging cable which also has a small diameter. One such cable comprises a three-conductor cable shielded by a surrounding shield.

SUMMARY OF THE INVENTION

In accordance with the present invention, there is provided a unique arrangement which enables a three-conductor, shielded cable to be used successfully with a well logging system of the type disclosed in the aforementioned Zemanek patent and Baldwin patent application. Two of the conductors and the shield are employed to transmit D-C power from the surface to electronic equipment in the logging tool. The third conductor and the shield are employed to transmit A-C power from the surface to the logging tool for driving a downhole motor and for other power supply purposes. The receiver signals and sync pulses are transmitted from the tool to the surface by way of the first two conductors. The control signal, which may be a directional signal or a cyclic pulse not dependent upon direction, is transmitted to the surface by way of the third conductor and the shield.

In a more specific aspect, a first downhole switch is employed to change the gain of a downhole amplifier through which the receiver signals are fed. A second downhole switch is provided for selecting either the directional signal or the cyclic pulse for control purposes. The first switch is coupled to the first two conductors, while the second switch is coupled to the third conductor. At the surface, a control arrangement coupled to the first two conductors is employed to control the first switch, while a second control arrangement coupled to the third conductor is employed to control the second switch.

BRIEF DESCRIPTION OF THE DRAWINGS

FIGS. 3a and 3b illustrate traces useful in understanding the present invention;

FIG. 4 illustrates the system for pulsing the downhole transducer for obtaining receiver signals and sync pulses;

FIG. 5 illustrates in one embodiment the manner in which the receiver signals may be recorded; and FIG. 6 illustrates in more detail one of the downhole systems for producing cyclic pulses as the transducer is rotated.

Referring now to FIG. 1, there will be described briefly the borehole logging system employed for carrying out logging operations in a borehole illustrated at 10. The borehole logging system comprises a slim hole tool 11 having a diameter small enough to pass through production tubing illustrated at 12. This tool has located therein an acoustic transducer 14 which acts as a transmitter and receiver of acoustic energy. During logging operations, the transducer 14 is rotated through 360° at a rate of about one revolution per second by motor 15, mechanical drive 16 (illustrated in detail in U.S. Pat. No. 3,378,097), sleeve 17, and transducer mount 18. The sleeve 17 rotates about mandrel 19 which connects end member 20 to structure 21. During each 360° cycle, the transducer 14 is pulsed periodically at a repetition rate of about 1,400 pulses per second for the application of acoustic pulses to the borehole wall by way of tool fluid 22, rubber boot 23, and borehole fluid 24. Pulse generator 30 periodically actuates the transducer 14 for the production of acoustic pulses. Between transmitted acoustic pulses, reflected energy is detected by the transducer 14, the output of which is amplified by system 31, and transmitted to the surface. Sync pulses are obtained from pulse generator 30 and also transmitted to the surface.

Figure 1:
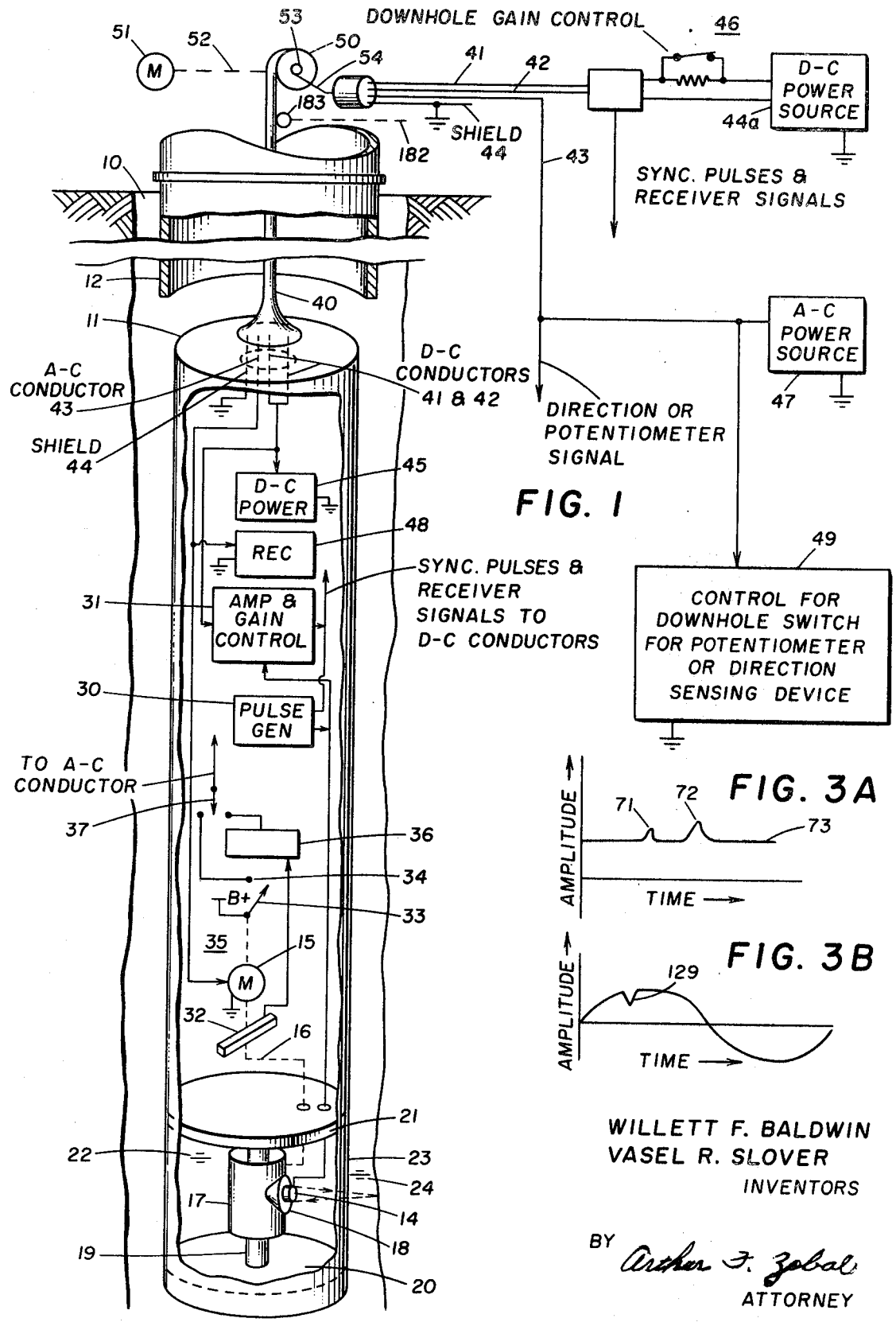
FIG. 1 illustrates the present invention as employed in combination with an acoustic well logging system.

Also coupled to mechanical drive 16 for rotation therewith is a magnetic north sensing means 32 and an arm 33 which cyclically contacts terminal 34 of a rotating switching system 35. The sensing means is coupled to circuitry 36 which produces an orienting signal each time the transducer 14 passes magnetic north. A cyclic pulse is produced as the arm 33 contacts terminal 34 upon rotation of the arm by the motor 15. A switching arrangement 37 is employed to transmit either the orienting signals or the cyclic pulses to the surface.

DESCRIPTION OF THE PREFERRED EMBODIMENT

In accordance with the present invention the downhole signals are transmitted to the surface, and surface power and control signals are transmitted downhole by way of a three-conductor, shielded cable illustrated at 40. The three conductors are illustrated at 41–43 and the shield is illustrated at 44. From the logging tool 11, the sync pulses and receiver signals are transmitted uphole by way of conductors 41 and 42, while the direction signals or output of rotating switching system 35 are transmitted to the surface by way of conductor 43.

At the surface, a D-C power source 44a is coupled to conductors 41 and 42 and the shield 44 for transmitting D-C power downhole to a power system illustrated at 45 which is a 30-volt regulated supply for the downhole amplifiers. A switching system 46 located uphole and coupled to conductors 41 and 42 is employed to transmit signals downhole to control the gain of the amplification system 31. In addition, an A-C power source 47 located at the surface is coupled to conductor 43 for transmitting A-C power downhole by way of conductor 43 and shield 44 to drive the motor 15. Downhole, part of this voltage is applied to rectifier 48 which is a high-level power system for the transducer 14, a stepping switch, and other circuitry. Also coupled to conductor 43 at the surface is a switch 49 for transmitting signals downhole for actuating switch 37 to transmit the output of circuitry 36 or of rotating switching system 35 to the surface by way of cable conductor 43.

During logging operations, the cable 40 is wound upon and unwound from drum 50 driven by motor 51 and connection 52. Slip rings and brushes illustrated at 53 and 54, respectively, are provided to transfer the signals and voltages between the cable portion coupled from the tool 11 to drum 50 and the cable portion coupled from drum 50 to the uphole power supplies and recording and control instrumentation.

Figure 2:
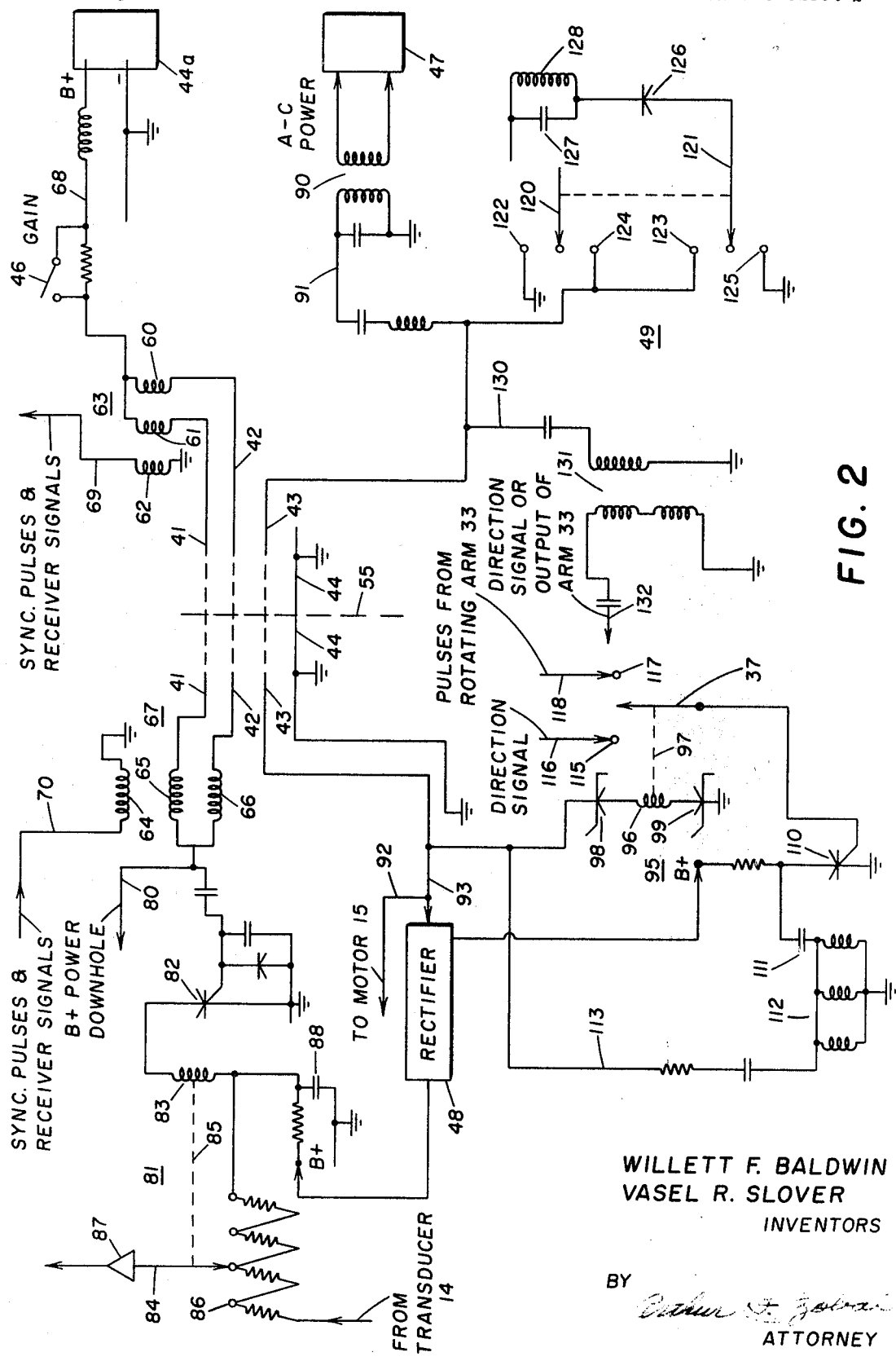
FIG. 2 is a detailed schematic drawing of the present invention.

Referring now to FIG. 2, there will be described in more detail the circuitry employed to couple the various downhole and uphole units to the three-conductor, shielded cable. The circuitry located to the left of line 55 is located in the tool 11, while the circuitry located to the right of line 55 is located at the surface. A phantom circuit, comprising uphole windings 60–62 of transformer 63 and downhole windings 64–66 of transformer 67, is provided to transmit D-C power and signal pulses over the conductors 41 and 42. D-C power source 44a is coupled to conductors 41 and 42 by way of conductor 68 and windings 60 and 61 of transformer 63. The sync pulses and receiver signals are taken from conductors 41 and 42 by way of transformer winding 62 and conductor 69. Downhole, the sync pulses and receiver signals are impressed upon conductors 41 and 42 by way of conductor 70 and windings 64–66 of transformer 67. In FIG. 3a, the sync signal and receiver signal are illustrated at 71 and 72 riding on top of the D-C voltage shown at 73.

Downhole, conductor 80 extends from conductors 41 and 42 for applying B+ power to the downhole electronics. In addition, a stepping switch 81, which may be a Ledex switch, is coupled to conductors 41 and 42 by way of silicon-controlled rectifier 82. The switch 81 includes a solenoid coil 83 coupled to movable arm 84 by connection 85. Arm 84 is adapted to be stepped to different rotary positions along the row of contact positions 86. These contacts are coupled to the transducer 14 through associated circuitry, while the arm 84 is coupled to amplifier 87. The purpose of the switch 81 is to change the gain or the amplitude of the receiver signals applied to amplifier 87. In operation, the silicon-controlled rectifier 82 normally is OFF or nonconducting and uphole switch 46 also is normally closed. In addition, downhole capacitor 88 is charged from a B+ voltage obtained from rectifier 48. When it is desired to change the gain, switch 46 is momentarily opened and then closed. This causes a positive firing pulse to be produced which then fires the SCR 82 allowing capacitor 88 to discharge through coil 83 whereby arm 84 is moved to a different contact position. As the capacitor 88 discharges and the firing pulse terminates, the SCR 82 becomes nonconducting again.

At the surface, the A-C power source 47 is coupled to cable conductor 43 by way of transformer 90 and circuitry illustrated at 91. Downhole, conductor 43 is coupled to motor 15 and to rectifier 48 by way of conductors illustrated at 92 and 93, respectively.

Downhole, a polarized magnetic latching relay 95 (comprising solenoid coil 96 coupled to switch 37 by connection 97 and back-to-back Zener diodes 98 and 99) is employed to control switch 37 for transmitting either the directional signal or the cyclic pulses from rotating arm 33 uphole by way of cable conductor 43. Switch 37 is coupled to cable conductor 43 by way of silicon-controlled rectifier 110, capacitor 111 (which is charged from B+), impedance matching transformer 112, and conductor 113. The direction signal is applied to terminal 115 by conductor 116, while the output of rotating switching system 35 is applied to terminal 117 by conductor 118.

The switch 37 may be defined as a magnetic latching switch in that it contacts either terminal 115 or terminal 117. It is moved from one terminal to the other by actuating the uphole control 49. This control comprises ganged switches 120 and 121 which may be moved momentarily to contact terminals 122 and 123, respectively, or terminals 124 and 125, respectively. When switches 120 and 121 are moved to contact terminals 122 and 123 momentarily, the downhole switch 37 is moved to contact terminal 115 to apply the directional signal to the cable conductor 43. When switches 120 and 121, however, are moved to contact terminals 124 and 125 momentarily, the downhole switch 37 is moved to contact terminal 117 to apply the output from rotating switching system 35 to the cable conductor 43.

In operation, the Zener diodes 98 and 99 do not break down by the A-C power applied downhole from supply 47. When switches 120 and 121 are moved to momentarily contact terminals 122–123, uphole diode 126 passes only the positive peaks of the A-C voltage. Thus, the voltage across capacitor 127 and choke 128 rises and the A-C voltage transmitted downhole is biased in the positive direction. This additional bias is sufficient to break down Zener diode 98. Since Zener diode 99 is ready to conduct in the positive direction, current flows through coil 96 to move switch 37 in one direction. When switches 120 and 121 are moved momentarily to contact terminals 124–125, an increase voltage in the negative direction is transmitted downhole to break down diode 99 whereby current flows through coil 96 in an opposite direction. This causes switch 37 to be moved in the other direction to contact the other terminal.

When switch 37 contacts either terminal 115 or 117, the positive pulses from the direction sensing means or from the rotating switching system 35 fire the SCR 110 which is normally nonconducting. When SCR 110 is fired, capacitor 111 discharges, whereby a signal is transmitted uphole by way of conductor 43. As capacitor 111 discharges and the pulse to SCR 110 terminates, the SCR becomes nonconducting again. In FIG. 3b, the pulse at 129 is either the directional signal or the pulse from the rotating switching system 35, riding on the A-C voltage impressed across conductor 43 and shield 44. At the surface, the directional signal or pulse transmitted is taken from cable conductor 43 by way of conductor 130, transformer 131, and conductor 132.

Referring now to FIG. 4, there will be described the borehole pulsing and sync signal producing system. The pulsing system comprises oscillator 139, silicon-controlled rectifier 140, and capacitor 141, the latter of which is charged from B+ (from rectifier 48) by way of resistor 142. Each pulse from oscillator 139 causes SCR 140 to conduct, thereby allowing capacitor 141 to discharge. The voltage generated by the discharge of capacitor 141 is coupled through transformer 143 to excite the transducer 14 to generate an acoustic pulse. The tuning coil 144 is employed to allow adjustment to obtain the desired frequency.

A portion of the discharge of capacitor 141 passes through the small capacitor 146 for the production of a sync pulse of relatively small amplitude. This sync pulse is applied by way of conductor 147 to conductor 148. It also triggers multivibrator 149 for the production of a pulse having a width which substantially coincides with the expected output produced by the transducer 14 when transmitting. This pulse is applied to the base of normally nonconducting transistor 150 to cause this transistor to conduct. Thus, during transmission of the transducer 14, the output thereof is applied by way of conductor 151 to the transistor 150 where it passes through transistor 150 to ground. Thus, transistor 150 acts as a gate to effectively block the output of the transducer 14 while it is transmitting. Following the production of the pulse by multivibrator 149, the transistor 150 becomes nonconductive and the transducer output produced upon the reception of reflected energy passes from conductor 151 to conductor 152 and then to amplifier and gain control 31 which comprises the stepping switch 181 and amplifier 87 described in connection with FIG. 2. The output from circuitry 31 is applied to conductor 148 where the sync pulses and the receiver signals are amplified at 154 and applied to detector circuit 155. This circuit produces the envelope of the receiver signals as well as the envelope of the sync pulse, which envelopes are applied to conductor 70 for application to cable conductors 41 and 42 as described previously.

Referring now to FIG. 5, there will be described briefly the manner in which the receiver signals may be recorded. As described previously, the receiver signals and the sync pulses are taken from cable conductors 41 and 42 by way of winding 62 and conductor 69. The sync pulses are amplified by amplifier 160 and applied to a sync multivibrator 161. This multivibrator produces a square-wave pulse of a relatively long duration which prevents spurious signals or receiver signals from coming through during the time of its production. This square wave is differentiated at 162. The pulse formed from the leading edge of the square wave is applied to trigger a delay multivibrator 163. Its square-wave output is differentiated at 164, and the pulse formed from the trailing edge of the square-wave output of multivibrator 163 is applied to trigger a gating multivibrator 165. This multivibrator produces a square-wave pulse which occurs when the receiver signal is expected. This square-wave pulse is applied to open the gate 166 whereby the receiver signals, amplified at 167, pass through the gate 166 to the Z axis input or to the cathode of the cathode ray tube of an oscilloscope 170.

When carrying out open hole logging, the downhole switch 37 is moved to contact terminal 115 to transmit directional signals uphole by way of conductor 43. These directional signals are produced each time the transducer 14 is rotated past magnetic north. When carrying out logging operations to log for corrosion or perforations in casing, the borehole switch 37 is moved to contact terminal 117 to transmit pulses from rotating switching system 35. This switching system produces one pulse during each revolution of the transducer 14. As mentioned previously, the directional signals or the cyclic pulses from rotating system 35 are taken from the cable conductor 43 by conductor 130, transformer 131, and conductor 132. The signals or pulses selected by switch 37 are amplified at the surface by amplifier 171 and applied to trigger a sawtooth wave generator 172, the output of which is applied to the vertical deflection plate of the oscilloscope 170. The selected signals or pulses thus initiate the sweep of the electron beam of the cathode ray tube of the oscilloscope when it is ON. The output signals from the transducer 14 intensity modulate the electron beam and turn it ON at a high repetition rate as it sweeps vertically across the screen 173. Thus, during each rotational cycle of the transducer 14, there is produced across the screen 173 of the oscilloscope 170 an illuminating trace illustrated at 174. Successive traces are stepped horizontally with depth and photographed by a camera 175 for the production of a two-dimensional print or display of successive traces and which display represents a folded-out section of the inside of the borehole wall.

The system for stepping the traces horizontally comprises a potentiometer 180, the arm of which is mechanically coupled through a gear reducer 181 to a mechanical connection 182 driven by reel 183, the latter of which is shown in FIG. 1. As the cable 40 is moved continuously to move the tool 11 through the borehole, the contact arm of the potentiometer 180 moves across the resistive element, thereby generating a slowly changing sweep voltage which is applied to the horizontal deflection plate of the oscilloscope 170. The oblique trace indicates the continuous change in depth of the logging tool. Each trace will begin at a horizontal position substantially where the preceding trace terminated.

In the embodiment disclosed, the oscilloscope 170 has a screen 173 with more available space in the horizontal direction. In order to obtain more pictures per depth with the same resolution, the system is arranged to sweep the traces 174 vertically across the screen 173. It is to be understood, however, that the traces 174 may be swept horizontally across the screen 173 by applying the output of sweep generator 172 to the horizontal deflection plate and the output of potentiometer 180 to the vertical deflection plate of the oscilloscope 170.

As disclosed in the above-mentioned U.S. Pat. No. 3,369,626, the magnetic north sensing means 32 may be a Hall-effect device displaced 90° with respect to the transducer 14 whereby an orienting pulse is produced with the Hall-effect device pointing west and with the transducer 14 pointing north. Instead of a Hall-effect device, a fluxgate magnetometer may be employed for the magnetic north sensing means 32 to produce the directional pulse each time the transducer 14 is rotated past magnetic north.

Referring now to FIG. 6, there will be described in more detail the manner in which the rotating switching system 35 produces a pulse upon each rotation of the transducer 14. The arm 33 is coupled to a B+ supply by way of conductor 190. When the arm 33 contacts terminal 34, capacitor 191 couples the B+ momentarily to the gate of SCR 110 of FIG. 2 through switch 37, turning SCR 110 ON. Capacitor 191 is partially charged up during this time, but as soon as arm 33 moves off of terminal 34, it discharges through resistor 192 and the gate of SCR 110.

What is claimed is:
1. In a logging system including:
 a borehole tool for insertion into a borehole,
 means in said tool for periodically generating a sync signal,
 sensing means in said tool for producing detector signals representative of borehole parameters of interest,
 means in said tool for generating repetitive control signals, and
 utilization means at the surface for utilizing the control signals generated and the sync signals generated for recording said detector signals in a desired manner, the combination therewith of:
  a shielded, three-conductor cable coupled between said tool and said surface-utilization means, a source of D-C power at the surface,
a source of A-C power at the surface,
means for coupling said D-C power source to two of said cable conductors,
means in said tool for coupling said two conductors to equipment in said tool for supplying power thereto,
means in said tool for applying said detector signals to said two cable conductors for transmission to the surface,
means in said tool for applying said sync signals to said two cable conductors for transmission to the surface,
means for coupling said A-C power source to said third cable conductor,
means in said tool for coupling said third cable conductor to equipment in said tool for supplying power thereto, and
means in said tool for applying said control signals to said third cable conductor for transmission to the surface.

2. In a logging system including:
an elongated borehole tool for insertion into a borehole,
an acoustic transducing system adapted to be rotated by a motor about the longitudinal axis of said tool,
means for cyclically generating a control signal upon the rotation of said acoustic transducing system,
said acoustic transducing system being operable to produce acoustic pulses periodically for exploratory purposes and to detect reflected acoustic pulses for the production of reflection signals,
means for generating a sync signal each time an acoustic pulse is produced, and
utilization means at the surface for utilizing the control signals generated and the sync signals generated for recording said reflection signals in a desired manner,
the combination therewith of:
a shielded, three-conductor cable having a shield coupled between said tool and said surface utilization means,
a source of D-C power at the surface,
a source of A-C power at the surface,
means for coupling said D-C power source to two of said cable conductors,
means in said tool for coupling said two conductors to electronic equipment in said tool for supplying power thereto,
means in said tool for applying said reflection signals to said two cable conductors for transmission to the surface,
means in said tool for applying said sync signals to said two cable conductors for transmission to the surface,
means for coupling said A-C power source to said third cable conductor,
means in said tool for coupling said third cable conductor to said motor, and
means in said tool for applying said control signals to said third cable conductor for transmission to the surface.

3. The combination of claim 2 comprising:
amplifying means in said tool for amplifying said reflection signals,
said means for generating said control signal comprises a first means for cyclically generating a first control signal each time said acoustic transducing system is rotated in a predetermined direction and a second means for generating a second control signal representative of each rotational cycle of said acoustic transducing system,
a first switch in said tool for changing the gain of said amplifying means,
a second switch in said tool for selecting either said first control signal or said second control signal,
said first switch being coupled to said first two conductors,
said second switch being coupled to said third conductor,
first control means at the surface coupled to said first two conductors for controlling said first switch, and
second control means at the surface coupled to said third conductor for controlling said second switch.

References Cited

UNITED STATES PATENTS 3,223,968  12/1965  De Shazo _____ 340—18

RODNEY D. BENNETT, JR., Primary Examiner

C. E. WANDS, Assistant Examiner

U.S. Cl. X.R.

181—0.5